(12) United States Patent
Smith et al.

(10) Patent No.: US 8,919,784 B2
(45) Date of Patent: Dec. 30, 2014

(54) FAN DUCT BLOCKER ACTUATION TAB SEAL

(75) Inventors: Darren M. Smith, Andover, CT (US); Judith F. Brooks, Oakland, CA (US)

(73) Assignee: United Technologies Corporation, Hartford, CT (US)

( * ) Notice: Subject to any disclaimer, the term of this patent is extended or adjusted under 35 U.S.C. 154(b) by 569 days.

(21) Appl. No.: 13/172,044

(22) Filed: Jun. 29, 2011

(65) Prior Publication Data

US 2013/0001892 A1 Jan. 3, 2013

(51) Int. Cl.
| | |
|---|---|
| F16J 15/02 | (2006.01) |
| F01D 11/00 | (2006.01) |
| F01D 25/16 | (2006.01) |
| F03B 11/00 | (2006.01) |
| F03D 11/00 | (2006.01) |
| F04D 29/08 | (2006.01) |
| F16J 15/00 | (2006.01) |
| F01D 17/14 | (2006.01) |
| F01D 25/14 | (2006.01) |
| F02C 7/18 | (2006.01) |

(52) U.S. Cl.
CPC .............. *F01D 17/143* (2013.01); *F01D 25/14* (2013.01); *F02C 7/18* (2013.01); *Y02T 50/675* (2013.01)
USPC ........... 277/637; 277/647; 415/113; 415/145; 415/214.1

(58) Field of Classification Search
USPC ................ 277/630, 637, 644, 590, 598, 647; 415/144, 145, 214.1, 116, 117, 176, 415/178, 110, 113; 60/266, 226.3, 262, 60/762, 39.23, 782, 785, 226.1; 239/265.11–265.41; 251/335.1
See application file for complete search history.

(56) References Cited

U.S. PATENT DOCUMENTS

| | | | | |
|---|---|---|---|---|
| 2,523,039 | A | * | 9/1950 | Mayou et al. .................... 415/17 |
| 3,638,428 | A | * | 2/1972 | Shipley et al. ............... 60/226.1 |
| 4,086,761 | A | * | 5/1978 | Schaut et al. ................ 60/226.1 |
| 4,275,560 | A | * | 6/1981 | Wright et al. ................ 60/226.3 |
| 4,715,779 | A | * | 12/1987 | Suciu ............................ 415/144 |
| 4,720,237 | A | * | 1/1988 | Weiner et al. ................. 415/150 |
| 5,694,767 | A | * | 12/1997 | Vdoviak et al. .............. 60/226.3 |
| 5,778,659 | A | | 7/1998 | Duesler et al. |
| 5,794,434 | A | | 8/1998 | Szupkay |
| 5,845,482 | A | * | 12/1998 | Carscallen ....................... 60/785 |
| 5,934,613 | A | | 8/1999 | Standish et al. |
| 6,439,841 | B1 | | 8/2002 | Bosel |
| 6,742,324 | B2 | * | 6/2004 | Bachelder et al. .............. 60/204 |
| 7,594,403 | B2 | * | 9/2009 | Cadieux ........................... 60/785 |
| 7,871,242 | B2 | * | 1/2011 | Swanson et al. .............. 415/145 |
| 8,177,490 | B2 | * | 5/2012 | Bouru ........................... 415/160 |

* cited by examiner

*Primary Examiner* — Vishal Patel
*Assistant Examiner* — Nicholas L Foster
(74) *Attorney, Agent, or Firm* — Carlson, Gaskey & Olds P.C.

(57) ABSTRACT

A seal assembly for a fan duct metering valve disposed within a casing of a gas turbine engine includes a tab for extending through an opening in the casing and attaching to the valve, a carrier for extending into the opening and engaging the valve such that fluid does not leak between the valve and the carrier.

16 Claims, 5 Drawing Sheets

FAN DUCT BLOCKER ACTUATION TAB SEAL

BACKGROUND

Gas turbine engine exhaust ducts include a liner disposed between an exhaust gas path and an engine casing. Cooling air flows between the liner and casing and is then discharged over nozzle seals and flaps located at the rear end of the exhaust duct to minimize damage that might be caused by high temperatures of the exhaust gas. In order to improve engine operation and performance, duct cooling air is carefully rationed. Since cooling air extracted from the engine may not be utilized to produce thrust, this cooling air may be a penalty to overall engine performance.

To control the quantity of cooling air flow while the engine is subjected to core pressure gradients at various operating conditions, a rotational flow balance system includes a member that is rotated to meter the flow cooling air flow through the duct. The member opens and closes a plurality of flow paths for the cooling air.

SUMMARY

According to an embodiment disclosed herein, a seal assembly for a fan duct metering valve disposed within a casing of a gas turbine engine includes a tab for extending through an opening in the casing and attaching to the valve, a carrier for extending into the opening and engaging the valve such that fluid does not leak between the valve and the carrier.

According to a further embodiment disclosed herein, a seal assembly for a rotational fluid metering valve disposed within a casing includes a tab for extending through an opening in the casing and attaching to the valve, a carrier for extending into the opening and engaging the valve such that fluid does not leak between the valve and the carrier.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
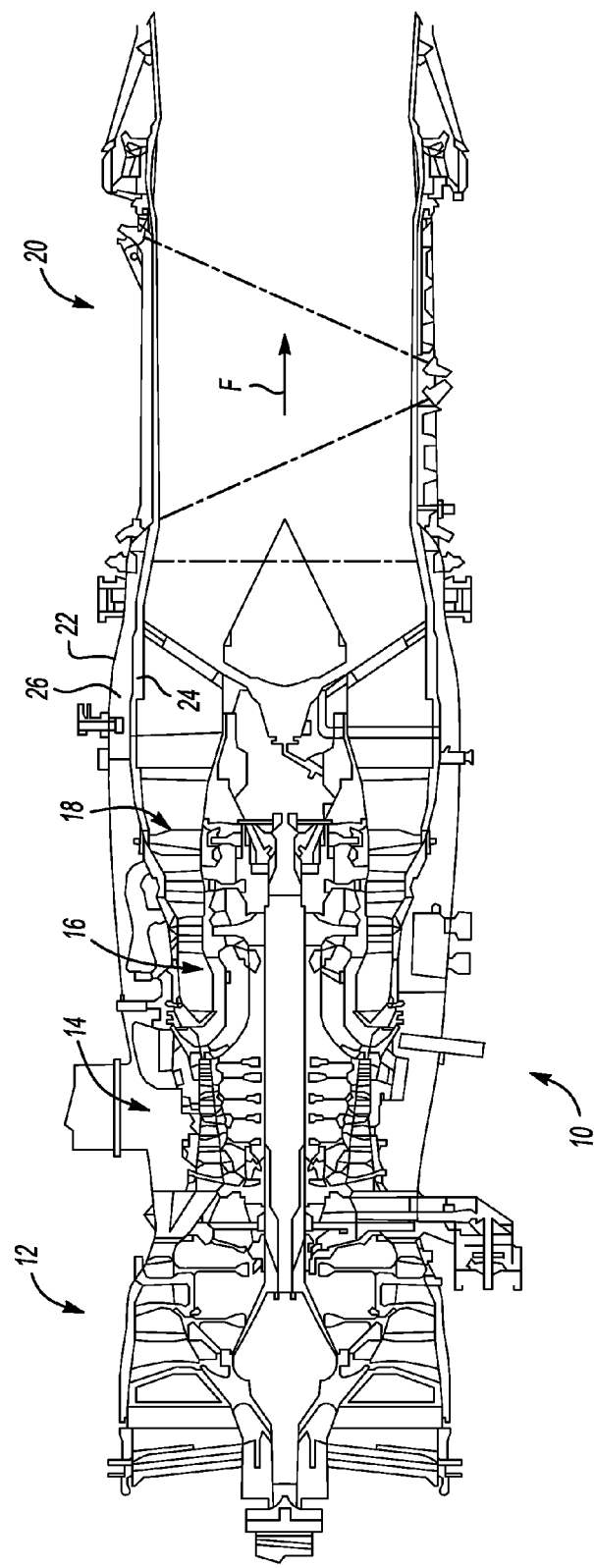
FIG. 1 is a general perspective view of an exemplary gas turbine engine embodiment for use with the present invention.

FIG. 1 schematically illustrates a gas turbine engine 10 that generally includes a fan section 12, a compressor section 14, combustor section 16, a turbine section 18, and a nozzle section 20. Aft of the compressor 16, engine components are typically cooled due to the intense temperatures of combustion gases typically generated in the engine 10.

An engine outer case 22 and an inner cooling liner structure 24 define an annular secondary fan bypass flow path 26. It should be understood that various structures within the engine may be defined as the outer engine case 22 and inner cooling liner structure 24 to define various cooling fluid (e.g., air) flow paths such as disclosed fan bypass flow path 26. The fan bypass flow path 26 guides a cooling air flow (illustrated schematically by arrow C in FIG. 2) between the outer engine case 22 and inner cooling liner structure 24. Cooling air flow C and/or other air flow that is different from the exhaust gas flow (illustrated schematically by arrow F) is typically sourced from the fan section 12 and/or compressor section 14. The cooling air flow C is utilized for a multitude of purposes including, for example, partial shielding of the nozzle section 20 from the intense heat of the exhaust gas flow F during particular operational profiles.

Figure 2:
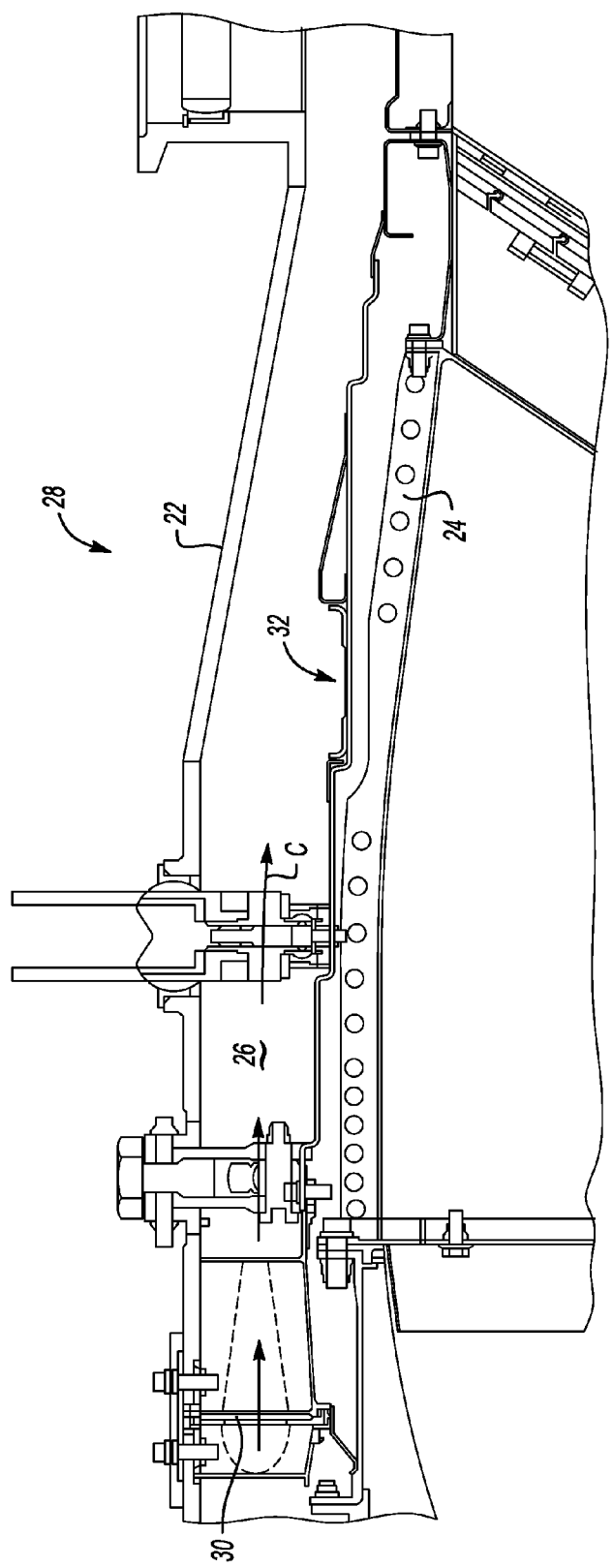
FIG. 2 is an expanded view of a rotational flow balance system within a fan bypass section of the gas turbine engine of FIG. 1.

Referring to FIG. 2, rotational flow balance system 28 generally includes a fan duct blocker ring 30 in a modulated exhaust cooling ring 32. The fan duct blocker ring 30 and the modulated exhaust cooling ring 32 are rotated between a blocking position and an open position dependent on whether the cooling air flow is required. Under certain conditions, such as when an aircraft (not shown) is hovering, less cooling air flow is required in the nozzle section 20 and by blocking the cooling air flow thereto; additional cooling air flow becomes available for other purposes.

Figure 3:
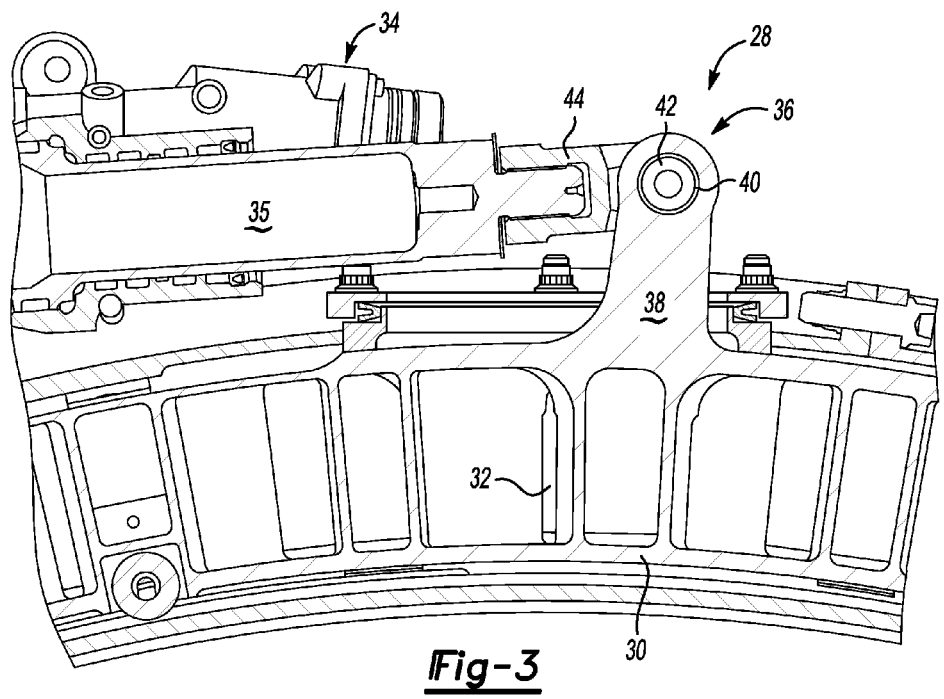
FIG. 3 is a general arrangement view of a rotational flow balance system.

Referring now to FIG. 3, the rotational flow balance system 28 includes an actuator system 34 having hydraulic hermetic or electromagnetic actuator 35 that controls operation of the fan duct blocker ring 30 and/or the modulated exhaust cooling ring 32 to open and close cooling air that may pass to the nozzle section 20 for cooling the end via a linkage 36 such that the fan duct blocker ring 30 can stop at a specified position to satisfy operational requirements. The fan duct (e.g., bypass flow path 26) may have a fixed ring 37 having a plurality of openings 39 that are opened and closed by rotation of fan duct blocker ring 30.

The linkage 36 includes a vertically extending tab 38 that attaches integrally with the fan duct blocker ring 30 and has a central opening therein 40 for receiving a bearing 42 that attaches to a rod 44 that fixedly, but removeably, attaches to the actuator 35 so that the actuator 35 and the rod 44 move as one. Motion of the actuator 35 rotates the fan duct blocker ring 30 to partially open, open or close openings 39 thereby metering the flow of cooling air into the duct (e.g., bypass flow path 26). Because the actuator is connected directly to the tab 38 via bearing 42, slop in the actuator system is minimized to provide accurate metering thereby. Other drives that are not directly connected to actuator 35, are not able to meet positioning requirements of the fan duct blocker to provide adequate cooling because of slop in the system.

Figure 4:
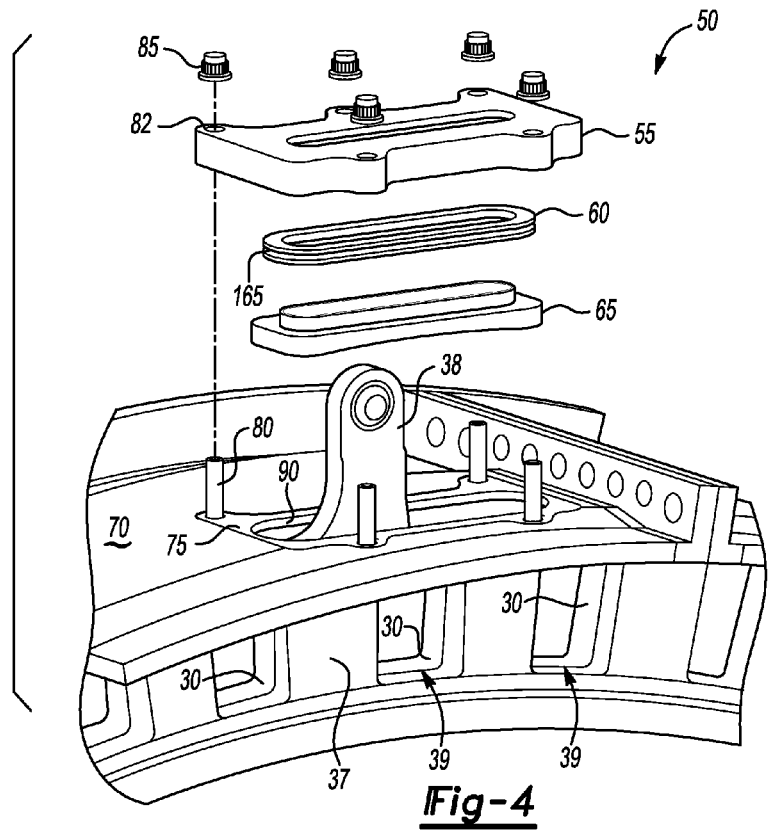
FIG. 4 is an exploded, perspective view of a seal for the rotational flow balance system of FIG. 3.

Because, however, use of the cooling air still must be controlled, leakage about the tab 38 is controlled as shown herein. Referring now to FIG. 4, details of a seal assembly 50 are shown herein. The seal assembly 50, which includes housing 55, a seal 60, and a seal carrier 65, is disposed on the fan duct 70. The housing 55 fits in a machined area 75 on the casing fan duct 70 that may be flat or contoured mates with the contour of the housing 55. Bolts 80 extend upwardly from the machined area 75 through openings 82 within the housing 55 and are then torqued down over the tab 38 by nuts 85 on bolts 80.

An oval slot 90 is cut into fan duct 70 to allow the tab 38 to extend therethrough. The slot 90 has a length corresponding to an operating range of the fan blocker 30.

Figure 5A:
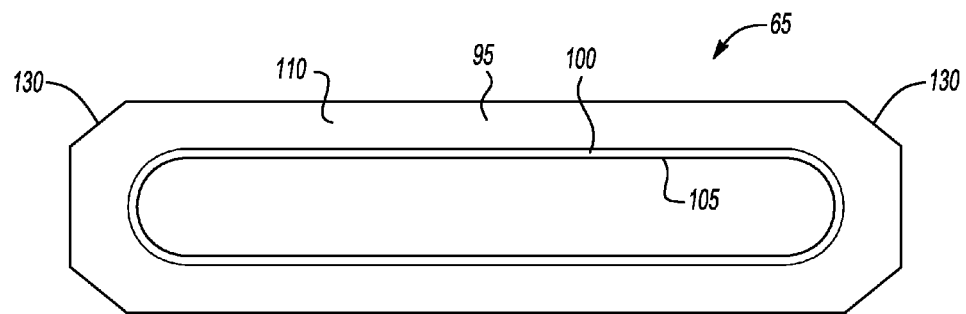
FIG. 5A is a top view of a seal carrier of FIG. 4.
Figure 5B:
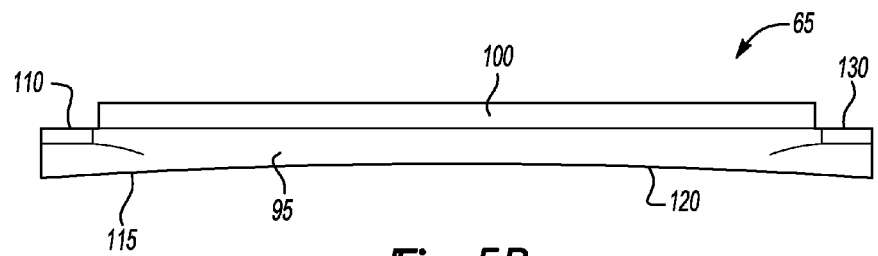
FIG. 5B is a side view of a seal carrier of FIG. 4.
Figure 5C:
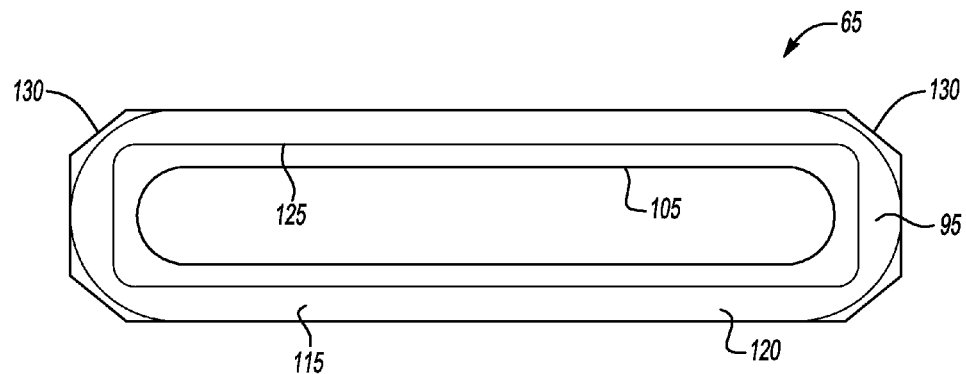
FIG. 5C is a bottom view of a seal carrier of FIG. 4.

Referring now to FIGS. 5A-5C, details of the seal carrier 65 are shown. FIG. 5A shows a top view of the seal carrier 65 and shows an extended octagonal body 95 including a lip 100 that defines an oval cutout 105. The body of the seal carrier 65 has a top surface 110. The seal carrier 65 has an arced base 115 (see FIG. 5B) to fit the contour of the machine surface area 75 in the fan duct 70. The arced base 115 is coated with a fibroid-like (e.g., a polytetrafluoroethylene-impregnated fabric or the like) material 120 that reduces friction at a sliding interface with the fan duct blocker ring 30 and provides a durable wear cycle surface. The arced base 115 has an oval shape to fit within the oval slot 90 and a generally rectangular cutout 125 to provide clearance for radius run outs at the base of the tab 38. The oval cutout 105 is placed symmetrically in relationship to the rectangular cut out 125.

The top base 110 has four angularly disposed surfaces 130 which extend outwardly from the top surface 110. The top surface 110 provides a base for the seal 60 that fits over the lip 100. The angular extensions 130 permit the seal carrier 65 to extend into the oval slot 90 without falling therethrough.

Figures 6A, 6B:
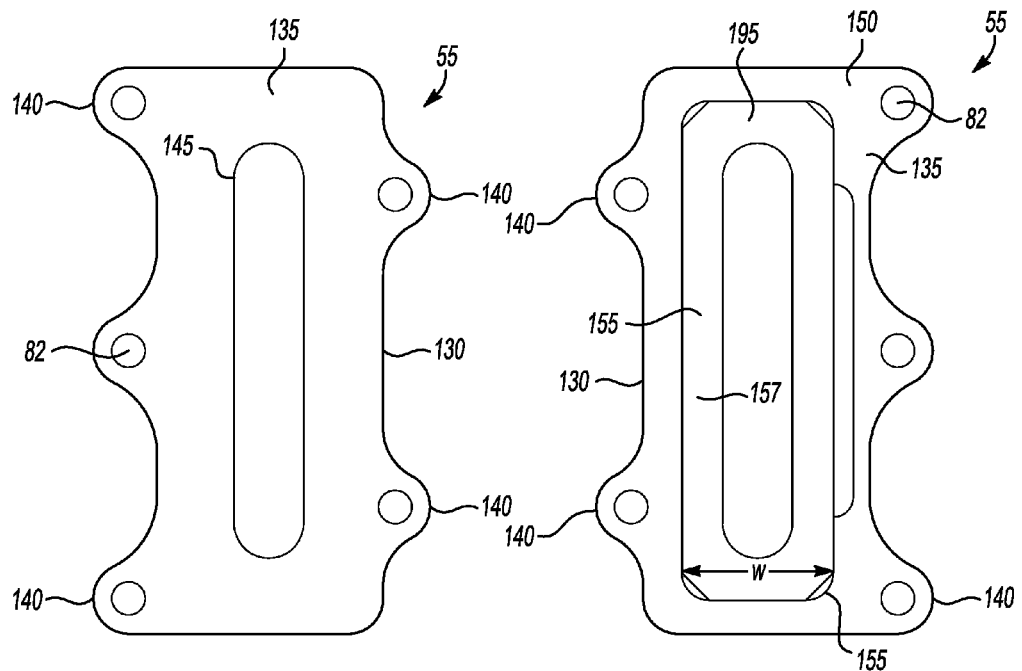
FIG. 6A is a top view of a housing carrier of FIG. 4.
FIG. 6B is a bottom view of a seal housing of FIG. 4.

Referring now to FIGS. 6A-6B, details of the seal housing 55 are shown. FIG. 6A shows a top view of the housing 55 having a generally rectangular body 130 having a plurality of five tabs 140 extending from the generally rectangular body having openings 82 for receiving bolts 80. Though five tabs 140 are shown herein, other numbers of tabs may be used and are contemplated herein. The housing body 135 has an oval orifice 145 that aligns with the lip 100 and oval cutout 105 of the seal carrier 165.

Referring to FIG. 6B, a bottom surface 150 has an aperture 155 defining a surface 157, the aperture aligning with the top surface 110 of the seal carrier 65 so that the seal carrier 65 fits within the aperture 155. The aperture 155 also has an extended octagonal shape.

Figures 7, 8:
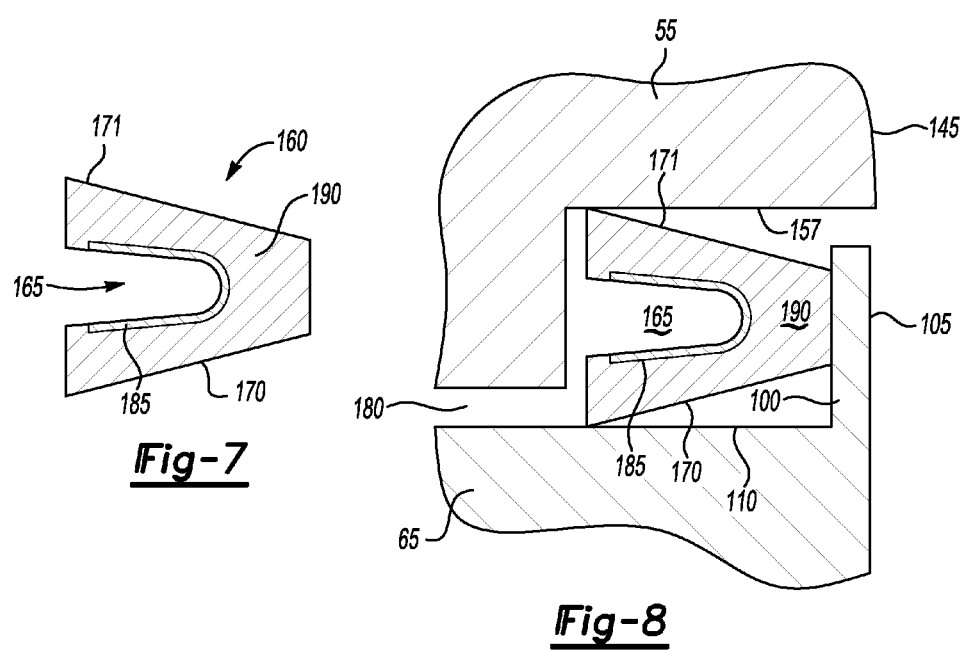
FIG. 7 is a side view of a seal of FIG. 4.
FIG. 8 is a side view of a seal carrier of FIG. 4 in situ.

Referring now to FIGS. 7 and 8, the seal 60 is shown. The seal 60 is oval and fits over the rim lip 100 of the seal carrier 65. Referring to FIG. 7, it is seen that the seal has a trapezoidal shape 160 having a groove 165 that encircles the seal (see also FIG. 4). The groove 165 defines a bottom leg 170 and top leg 171 in the seal 60. The bottom leg 170 engages top surface 110 of the seal carrier 65 as can be seen in FIG. 8 and the top leg 171 engages the surface 157 of the seal housing aperture 155.

To assemble the seal assembly 50, the housing 55 is torqued down into the machined area 75 as nuts 85 are tightened over bolts 80. Because the legs 170, 171 of the seal 60 are springy, torquing the housing down to the seal carrier 65 creates an effective seal because leg 170 tends to flatten against surface 157 and leg 171 tends to flatten against top surface 110. The width W of the cutout 155 provides area for the legs 170, 171 of the seal 60 to extend outwardly with room to spare (see FIG. 8). Moreover, if pressure of the cooling air increases, it tends to flow between a gap 180 between the housing 55 and the carrier 65. That cooling air enters the groove 165 further causing the legs 170, 171 to separate and provide a more effective seal against surface 157 and top surface 110.

The seal carrier 65 and the housing 55 are made of machined titanium or other hard metal that can survive in the rigorous gas turbine engine environment. The rounded base 115 is designed to ride upon the seal blocker 30 and the fabroid material 120 reduces drag to add accuracy of the system. The surface 157 of the housing is nickel plated 195 (see FIG. 6B) to protect the seal housing 55 in the event there is relative movement between the seal 60 and the seal housing 55. The seal 60 may be made of a cobalt alloy spring 185 encased by filled polytetrafluoroethylene 190.

The seal 60 is compressed between the seal housing 55 and seal carrier 65. Its function is to load the seal carrier 65 against the fan duct blocker ring 30 in order to create a seal at the sliding interface between those parts and to create a seal between the seal carrier 65 and the seal housing 55. Because the seal carrier 65 floats on the fan duct blocker ring 30 and the housing 55 is mounted to the duct 70, there is a large accumulation of radial tolerance between the parts. The sum of these tolerances sets the range of deflection for the seal.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A seal assembly for a fan duct metering valve which selectively regulates a flow of fluid within a fan duct of a gas turbine engine, said seal assembly comprising:
    a tab for extending through an opening in a casing of said gas turbine engine and attaching to said valve, said tab circumferentially slidable within said opening to adjust said valve;
    a carrier for extending into said opening and engaging said valve;
    a seal disposed upon said carrier, wherein said tab extends through said seal, said seal including a groove encircling said seal;
    a housing disposed upon said seal, said seal disposed between said housing and said carrier, said housing spaced-apart from said carrier by a gap; and
    wherein said seal includes a first leg and a second leg provided on opposite sides of said groove, said seal arranged such that fluid flowing through said gap enters said groove and urges said first leg and said second leg away from one another to provide an effective seal between said housing and said carrier.

2. The seal assembly of claim 1 further comprising:
    an actuator attaching directly to said tab via a bearing.

3. The seal assembly of claim 1 wherein said seal is shaped like an oval.

4. The seal assembly of claim 3 wherein said seal has a cross-section that is approximately in the shape of a trapezoid.

5. The seal assembly of claim 3 wherein said seal comprises a spring coated with a filled polytetrafluoroethylene material.

6. The seal assembly of claim 1 wherein said carrier has an octagonal shape having corners for preventing said carrier from falling through said opening.

7. The seal assembly of claim 1 wherein said carrier has an oval lip extending upwardly therefrom for holding a spring.

8. The seal assembly of claim 1 wherein said carrier has a rounded bottom for riding on a profile of said valve.

9. The seal assembly of claim 8 wherein said bottom is lined with a friction-reducing, wear-resistant coating.

10. The seal assembly of claim 1 wherein said housing has an aperture in a lower surface thereof in which said carrier fits, and wherein said housing is adapted to be attached to said casing.

11. The seal assembly of claim 10 wherein said aperture has a depth, and wherein, upon attaching said housing to said casing, a spring is compressed and said housing does not directly physically contact said carrier.

12. The seal assembly of claim 1 further comprising a spring adjacent said groove, said spring urging said first leg and said second leg into engagement with a respective one of said carrier and said housing.

13. The seal assembly of claim 1 wherein said groove faces away from said tab.

14. The seal assembly of claim 1 wherein said carrier, said housing, and said casing are separate structures.

15. A seal assembly for a rotational fluid metering valve which selectively regulates a flow of fluid within a fan duct of a gas turbine engine, said seal assembly comprising:

- a tab for extending through an opening in a casing of said gas turbine engine and attaching to said valve, wherein the tab is attached integrally to a ring of said valve, said tab circumferentially slidable within said opening to adjust said valve;
- a carrier for extending into said opening and engaging said valve;
- a seal disposed upon said carrier, wherein said tab extends through said seal, said seal including a groove encircling said seal; and
- a housing disposed upon said seal, said seal disposed between said housing and said carrier, said housing spaced-apart from said carrier by a gap, said seal arranged such that fluid flowing through said gap enters said groove to provide an effective seal between said housing and said carrier.

16. The assembly of claim 15 wherein said carrier has a rounded bottom for riding on a profile of said valve.

\* \* \* \* \*